Patented June 26, 1951

2,558,560

UNITED STATES PATENT OFFICE 2,558,560

METHOD OF PREPARATION OF FLEXIBLE ORGANOPOLYSILOXANES BY CONTACTING A LIQUID POLYSILOXANE WITH A BORON HYDRIDE

Moyer M. Safford, Schenectady, N. Y., assignor to General Electric Company, a corporation of New York No Drawing. Application September 12, 1950, Serial No. 184,528

8 Claims. (Cl. 260—46.5)

1

This invention is concerned with the preparation of synthetic elastic or flexible compositions comprising organopolysiloxanes. More particularly the invention is concerned with a method of making an elastic gum which comprises contacting a liquid organopolysiloxane, for example, a methyl polysiloxane, containing an average of from about 1.75 to 2.5 organic groups, for instance, methyl groups per silicon atom with a boron hydride. For purposes of brevity the term "boron hydride" will be referred to hereinafter in the specification and in the claims as including compounds of boron containing a boron-bonded hydrogen atom as, for example, pure boron hydrides, e. g., liquid and solid boron hydrides, complex addition products or derivatives of the boron hydrides, organic derivatives of boron hydrides as, for example, diphenyl decaborane, etc.

Heretofore it has been known that liquid organopolysiloxanes used in making solid elastic products known in the art as silicone rubber, can be condensed to give solid elastic gums by effecting condensation and polymerization of the liquid organopolysiloxane by treatment with various agents including acidic agents as, for instance, sulfuric acid, hydrochloric acid, etc., as well as alkaline materials such as for example, sodium hydroxide, potassium hydroxide, sodium carbonate, etc. In many instances, the use of such acidic or alkaline materials necessitates the removal of these polymerizing agents in order to minimize depreciation of some of the properties of the finally cured silicone rubbers.

I have now discovered that elastic gums may be prepared by suitable treatment of organopolysiloxanes whereby the condensing agent used to form these elastic gums may be permitted to remain in the gum without any harmful effects and in many cases, with certain improved effects. These elastic gums may be compounded with fillers, cure accelerators, etc., and molded or extruded to form products exhibiting many of the physical characteristics such as elasticity, compressibility, etc., of known natural rubber and other synthetic elastomers. The products are characterized by their flexibility at low temperatures and particularly by their heat resistance. The synthetic organopolysiloxane elastomers made from these elastic gums retain their tensile strength, elongation or stretch, flexibility, etc., even when heated for long periods of time at elevated temperatures of, for example, from 150 to 200° C. without noticeable deterioration.

The organopolysiloxanes with which this invention is concerned are materials which contain

2 alternate silicon and oxygen atoms and which have organic radicals linked to the solicon atoms by carbon-silicon bonds. The organopolysiloxanes which are employed as the starting materials in this process may be either linear or cyclic organosiloxane derivatives.

The organopolysiloxanes found suitable for the preparation of the elastic gums as well as the synthetic elastomers possessing the above mentioned properties are those obtained, for example, by the hydrolysis of organosilanes containing hydrolyzable groups attached to the silicon atom, for instance, pure or substantially pure diorganodihalogenosilane, for example, dimethyldichlorosilane, or a diorgano-substituted silane whose other two valences are satisfied by radicals which themselves are readily hydrolyzable, for instance, hydrogen, amino, alkoxy, aroxy, acyloxy, etc., radicals. While the term diorganopolysiloxane has been broadly used to designate complex condensation products containing an average of around two organic groups per silicon atom, it is used herein and in the appended claims to mean a silicone (polysiloxane) in which all or substantially all of the silicon atoms are each connected to two organic groups; for example, two methyl groups.

It will, of course, be apparent to those skilled in the art that instead of using pure diorganopolysiloxanes it may be possible to employ linear organopolysiloxanes containing an average of from about 1.90 to 2.25, e. g., 1.98 to 2.1 organic groups (for instance, hydrocarbon groups) per silicon atom. Preferably, I employ organopolysiloxanes containing an average of approximately or even almost exactly two organic groups per silicon atom, for example, the cyclic organosiloxanes, more particularly cyclic dialkyl siloxanes, cyclic alkyl aryl siloxanes, as described in an article by Hyde and DeLong J. A. C. S. 63, 1194 (1941). My invention is particularly directed to the condensation of dimethylpolysiloxanes containing an average of about 1.95 to 2.2, preferably around two methyl groups per silicon atom, or methyl phenyl polysiloxanes containing an average of about two total methyl and phenyl radicals per silicon atom.

Various methods may be used to prepare the the organopolysiloxanes used in the practice of this invention. Using as an illustration the preparation of substantially pure dimethyl polysiloxane, substantially pure dimethyldichlorosilane or dimethyldichlorosilane containing up to about two mol percent methyltrihalogenosilane, more specifically methyl trichlorosilane, is hydrolyzed in manners now well known in the art. The oily hydrolysis product may then be fractionally distilled to remove the low boiling materials (trimers, tetramers, etc.) thereby obtaining the higher molecular weight liquid dimethyl silicones which then may be contacted with the boron hydride to convert it to a dimethyl silicone gum. Optimum properties of the dimethyl silicone gum as well as of the dimethyl silicone elastomer prepared therefrom are obtained from hydrolysis products of essentially pure dimethyldichlorosilane free of other chlorosilanes, although in some applications small amounts of methyltrichlorosilane, for example, about 0.01 and 0.2 mol percent methyltrichlorosilane, may be added or may be present in the dimethyldichlorosilane prior to hydrolysis thereof.

It will, of course, be apparent to those skilled in the art that prior to the hydrolysis, in addition to the possible presence of mono-organotrihalogenosilanes, there may also be present triorganomonohalogenosilanes, for example, trimethylchlorosilane, either alone with the dimethyldichlorosilane, or with the dimethyldichlorosilane and methyltrichlorosilane, to give again a methyl-to-silicon ratio of about two, the monofunctional material balancing the trifunctional material. Examples of organopolysiloxanes which can be employed to make the elastic products of my invention are more particularly described in Patnode Patent 2,469,888 issued May 10, 1949, in U. S. 2,457,688—Krieble et al., issued December 28, 1948, in Agens Patent 2,448,756, both of the latter patents being issued September 7, 1948, Sprung Patent 2,484,595, issued October 11, 1949, and Hyde Patent 2,490,357 issued December 6, 1949.

Among the boron hydrides which may be employed in the practice of the invention may be mentioned, for example, decaborane ($B_{10}H_{14}$), pentaborane ($B_5H_9$), $B_6H_{10}$, etc.; complexes of the boron hydrides as, for example, the ammonia complex of diborane having the formula $B_2H_6 \cdot 2NH_3$, etc.; organic derivatives of boron hydrides as, for instance, diphenyl decaborane, reaction products of boron hydrides, e. g., $B_{10}H_{14}$ with hexamethylene tetramine, or with p,p'-diaminodiphenyl methane, etc. It will, of course, be apparent to those skilled in the art that other boron hydrides of similar nature may be employed without departing from the scope of the invention.

The amount of boron hydride which can be used to effect conversion of the liquid organopolysiloxane to the solid elastic state may be varied within wide limits without departing from the scope of the invention. Thus, on a weight basis I may use, e. g., from 0.1 to as high as 5 or 10%, by weight, of the boron hydride based on the weight of the organopolysiloxane, for example, the dimethyl polysiloxane. Preferably the amount of the boron hydride is from about 0.25 to 3%, by weight, based on the weight of the organopolysiloxane.

The transformation of the organopolysiloxane to an elastic gum may be accomplished in a number of ways. One method comprises mixing thoroughly the boron hydride with the organopolysiloxane, for instance: the dimethyl polysiloxane, and allowing the mixture to stand with or without agitation at normal temperatures or at elevated temperatures for varying periods of time. The conversion of the organopolysiloxane to the solid elastic state is hastened by heating the mixture at elevated temperatures ranging from substantially above room temperature up to about 150° C. to even as high as 200° C. The time required to convert the organopolysiloxane to the elastic state will differ depending, for example, upon the concentration of the boron hydride, the type of organopolysiloxane used, the temperature at which the conversion is being effected, etc. For example, at room temperatures from about 6 hours to 5 to 8 days may be required to convert the organopolysiloxane to an elastic gum having suitable properties. At lower temperatures the time for conversion materially increases while at higher temperatures conversion may be effected in shorter periods of time.

To prepare the synthetic elastomers (synthetic organopolysiloxane elastomers or silicone rubbers), the elastic gum is worked on ordinary mixing (differential) rolls used in milling rubber until it attains the desired consistency for molding or extruding. Various fillers, for example, titanium dioxide, lithopone, celite, silica aerogal, etc., and cure accelerators, for example, benzoyl peroxide, tertiary butylperbenzoate, etc., in an amount equal to from about 0.5 to 5 or 6%, by weight, of the organopolysiloxane gum may be incorporated during this operation. After being formed to the desired shape, for example, under heat and pressure, the cured synthetic organopolysiloxane elastomer may be further cured or vulcanized by heating in an oven until the desired degree of cure is obtained. The latter heat treatment in many cases increases the strength of the synthetic elastomer.

In order that those skilled in the art may better understand how the present invention may be practiced, the following examples are given by way of illustration and not by way of limitation. All parts are by weight. The liquid dimethylpolysiloxane employed in the following examples may be obtained by any of several methods. For example, pure or substantially pure dimethyldichlorosilane may be hydrolyzed in aqueous hydrochloric acid or in an aqueous solution of sodium or potassium hydroxide, etc. Although the method of hydrolysis is not critical, I prefer to use a procedure which yields a liquid product containing a minimum of low boiling polymers. Such products are obtained, for example, when the hydrolysis is carried out in, for instance, an aqueous solution of certain metal halides; for instance, ferric chloride or alkali-metal hydroxide, as, for example, sodium hydroxide or potassium hydroxide.

*Example 1*

In this example 100 parts by weight of substantially pure liquid dimethylpolysiloxane obtained by hydrolyzing essentially pure dimethyldichlorosilane was treated with varying amounts of decaborane ($B_{10}H_{14}$) which had been first dissolved in a small amount of carbon disulfide. The components were stirred well together for about 10 minutes until a clear solution was formed and the carbon disulfide was evaporated by heating the mixture of methyl polysiloxane and decaborane at a temperature of about 70° C. Heating at this temperature did not cause any noticeable polymerization of the dimethylpolysiloxane. The following Table I shows the results of heating various mixtures of the dimethylpolysiloxane and the decaborane for different times at different temperatures. The per cent boron hydride was based on the weight of the liquid dimethylpolysiloxane.

TABLE I

| Sample No. | Per cent $B_{10}H_{14}$ | Temperature °C. | Time Heated Hours | Remarks |
|---|---|---|---|---|
| A | 0.1 | 150 | 52 | Set up to clear water white gummy elastomer. |
| B | 0.1 | 200 | 12 | Same as A. |
| C | 0.25 | 125 | 12 | Do. |
| D | 0.25 | 150 | 6 | Do. |
| E | 0.25 | 200 | 2.5 | Do. |
| F | 0.5 | 150 | 82.5 | Do. |
| G | 0.5 | 200 | 13 | Do. |

*Example 2*

In this example, sample gums B and E of Example 1 were each compounded into two different formulations. In one formulation there was employed 1%, by weight, benzoyl peroxide as the cure accelerator and in the other formulation there was employed 0.1% by weight $B_{10}H_{14}$ as a cure accelerator. These formulations were as follows, the percents indicated being, by weight:

Formulation No. 1—33% silicone gum
66% $TiO_2$
1% benzoyl peroxide

Formulation No. 2—33% silicone gum
66.9% $TiO_2$
0.1% $B_{10}H_{14}$

Each of the gums was milled on milling rolls until they formed a sheet and the filler was then added and the catalyst added last. Each sample was pressed at a pressure of about 500 p. s. i. for 10 minutes at 150° C. to form a sheet approximately 4″ x 6″ x 0.75″. These sheets were then further cured by heating in a circulating air oven for 48 hours at 200° C. after which the following physical data was obtained on the resulting rubbery sheets:

TABLE II

| Sample No. of Gum | Formulation No. | Tensile Strength, p. s. i. | Per cent Elongation |
|---|---|---|---|
| B | 1 | 397 | 60 |
| E | 2 | 252 | 93.5 |
| B | 1 | 511 | 60 |
| E | 2 | 160 | 80 |

It will, of course, be apparent to those skilled in the art that other organopolysiloxanes than the dimethylpolysiloxane employed above can be used to make the solid elastic products. Thus, I may employ organopolysiloxanes in which the organic radicals may be aliphatic radicals such as, for example, methyl, ethyl, propyl, isopropyl, butyl, amyl, hexyl, etc.; alicyclic radicals such as, e. g., cyclopentyl, cyclohexyl, etc.; aryl radicals, for example, phenyl, naphthyl, etc.; alkaryl radicals, for example, tolyl, xylyl, etc.; arylkyl radicals, for instance, benzyl, ethylphenyl, etc.; alkenyl radicals such as, for example, allyl, methallyl, etc.; heterocyclic radicals, etc.; mixtures of silicon-bonded organic radicals, etc. The above organic radicals may also, if desired, contain inorganic substituents such as halogens, etc. It is preferred that at least 60 mol per cent of the liquid organopolysiloxane comprise copolymerized dialkylsiloxane, e. g., dimethylsiloxane.

Generally, I prefer to use organopolysiloxane containing an average of around two organic groups per silicon atom. However, as pointed out previously, I may employ lower or higher ratios of organic groups per silicon atom as, for example, from about 1.75 to 2.25 organic groups per silicon atom. Preferably I use as the organopolysiloxane a methyl polysiloxane; for example, one containing about two methyl groups per silicon atom, or methyl polysiloxanes containing up to about 25 to 50% copolymerized diphenylsiloxane or methylphenylsiloxane ($CH_3C_6H_5SiO$). For improved heat stability it is desirable to employ the methyl polysiloxanes in an essentially pure state, whereas for applications requiring low temperature flexibility small amounts of phenyl groups in the organopolysiloxane aids this property.

It will, of course, be understood by those skilled in the art that fillers other than the titanium dioxide disclosed in the foregoing examples may also be used. These include: zinc oxide, talc, ferric oxide and other finely divided solid materials often employed as fillers for known natural and synthetic rubbers. In addition, other cure accelerators, as for example, tertiary butyl perbenzoate, may be used in place of the benzoyl peroxide to effect conversion of the solid elastic gums to the cured, substantially infusible and insoluble state.

The organopolysiloxane gums and elastomers prepared therefrom are useful in applications where materials having elastic-like properties are required, for instance, for gaskets, electrical conductor insulation, shock absorbers, etc. Owing to their extraordinary resistance to deterioration at elevated temperatures, they are particularly useful in applications where natural rubber or other synthetic elastomers fail due to the deleterious effect of heat. Synthetic dimethyl silicone elastomers prepared from the dimethyl silicone gums made according to my invention are further endowed with the property of retaining their flexibility at low temperatures.

What I claim as new and desire to secure by Letters Patent of the United States is:

1. A method for preparing a heat-curable hydrocarbon-substituted polysiloxane which comprises contacting a liquid hydrocarbon-substituted polysiloxane containing an average of from about 1.75 to 2.25 hydrocarbon groups per silicon atom with from 0.1 to 10%, by weight, of a boron hydride.

2. A method for preparing a heat-curable polymerized methyl-substituted polysiloxane which comprises contacting a liquid methylpolysiloxane containing an average of from 1.75 to 2.25 methyl groups per silicon atom with from 0.1 to 10%, by weight, of a boron hydride.

3. A method for preparing a solid elastic heat-curable polymerized methyl-substituted polysiloxane which comprises contacting a liquid methylpolysiloxane containing an average of from 1.75 to 2.25 methyl groups per silicon atom with from 0.1 to 5%, by weight, $B_{10}H_{14}$.

4. A method for preparing a solid elastic heat-curable polymerized methyl-substituted polysiloxane which comprises contacting a liquid methylpolysiloxane containing an average of from 1.75 to 2.25 methyl groups per silicon atom with from 0.1 to 5%, by weight, of $B_5H_9$.

5. A method for preparing a solid elastic heat-curable polymerized methyl-substituted polysiloxane which comprises contacting a liquid methylpolysiloxane containing an average of from 1.75 to 2.25 methyl groups per silicon atom with from 0.1 to 5%, by weight, of an ammonia complex of diborane having the formula $B_2H_6 \cdot 2NH_3$ 6. A method for preparing a solid elastic heat-curable polymerized methyl-substituted polysiloxane which comprises contacting a liquid methylpolysiloxane containing an average of from 1.75 to 2.25 methyl groups per silicon atom with from 0.1 to 5%, by weight, diphenyl decaborane.

7. A method for preparing a solid, elastic heat-curable methyl polysiloxane which comprises contacting a liquid methylpolysiloxane containing an average of about 2 methyl groups per silicon atom with from 0.1 to 5%, by weight, $B_{10}H_{14}$.

8. A method for preparing a heat-curable hydrocarbon-substituted polysiloxane which comprises contacting a liquid hydrocarbon-substituted siloxane containing an average of from about 1.75 to 2.25 hydrocarbon groups per silicon atom with from 0.1 to 10%, by weight, of a boron hydride selected from a class consisting of decaborane, pentaborane, hexaborane, ammonia complex of diborane having the formula $B_2H_6 \cdot 2NH_3$ and, diphenyl decaborane.

MOYER M. SAFFORD.

No references cited.